(12) United States Patent
Nagata (10) Patent No.: US 9,077,895 B2
(45) Date of Patent: Jul. 7, 2015

(54) CAMERA APPARATUS AND CONTROL METHOD FOR SELECTING A TARGET FOR ZOOM PROCESSING IN AN IMAGE

(71) Applicant: KYOCERA Corporation, Kyoto (JP)

(72) Inventor: Keisuke Nagata, Daito (JP)

(73) Assignee: KYOCERA Coporation, Kyoto (JP)

( * ) Notice: Subject to any disclaimer, the term of this patent is extended or adjusted under 35 U.S.C. 154(b) by 71 days.

(21) Appl. No.: 13/628,733

(22) Filed: Sep. 27, 2012

(65) Prior Publication Data

US 2013/0076945 A1    Mar. 28, 2013

(30) Foreign Application Priority Data

Sep. 28, 2011  (JP) ................. 2011-211864

(51) Int. Cl.
*H04N 5/262*  (2006.01)
*H04N 5/232*  (2006.01)

(52) U.S. Cl.
CPC ....... *H04N 5/23219* (2013.01); *H04N 5/23296* (2013.01)

(58) Field of Classification Search
CPC . H04N 5/23296; H04N 5/2628; H04N 5/232; H04N 5/23212; H04N 5/23293; H04N 3/1562; H04N 5/23219; H04N 5/23222
USPC ........................................ 348/240.99, 240.2
See application file for complete search history.

(56) References Cited

U.S. PATENT DOCUMENTS

| | | | | |
|---|---|---|---|---|
| 7,248,294 | B2 * | 7/2007 | Slatter | 348/240.99 |
| 8,493,477 | B2 | 7/2013 | Kubota | |
| 2005/0041111 | A1 * | 2/2005 | Matsuoka | 348/207.99 |
| 2005/0128315 | A1 * | 6/2005 | Mori et al. | 348/222.1 |
| 2011/0149120 | A1 * | 6/2011 | Kubota | 348/240.99 |
| 2011/0221911 | A1 * | 9/2011 | Kang | 348/207.99 |
| 2012/0165648 | A1 * | 6/2012 | Ferrantelli | 600/407 |
| 2012/0327258 | A1 * | 12/2012 | Holland et al. | 348/222.1 |
| 2013/0120618 | A1 * | 5/2013 | Wang et al. | 348/240.99 |

FOREIGN PATENT DOCUMENTS

| | | | | |
|---|---|---|---|---|
| JP | 04308808 | A * | 10/1992 | ............... G02B 7/28 |
| JP | H07-295020 | A | 11/1995 | |
| JP | 2005-269153 | A | 9/2005 | |
| JP | 2008-148161 | A | 6/2008 | |
| JP | 2011-130382 | A | 6/2011 | |

\* cited by examiner

*Primary Examiner* — Antoinette Spinks
(74) *Attorney, Agent, or Firm* — Procopio, Cory, Hargreaves & Savitch LLP (57) ABSTRACT

A processor (30) of a mobile terminal (10) that is one example of a camera apparatus detects a face image of a person image (58) in an object image displayed on a display (14) prior to an imaging key (26) is operated, and displays a face mark (60) at a portion of the face of each person image. A user selects arbitrary one or more person image out of the person images onto each of which the face mark is displayed as a zoom processing target by operating an operating portion such as a GUI. A selection mark (62) is applied to a person image that the user selects. A zooming-up and/or down (zoom processing) is performed such that the object image including the person image onto which the selection mark is applied is rendered to a predetermined composition.

14 Claims, 7 Drawing Sheets

CAMERA APPARATUS AND CONTROL METHOD FOR SELECTING A TARGET FOR ZOOM PROCESSING IN AN IMAGE

CROSS REFERENCE OF RELATED APPLICATION

The disclosure of Japanese Patent Application No. 2011-211864 is incorporated herein by reference.

BACKGROUND OF THE INVENTION

1. Field of the Invention

The present invention relates to a camera apparatus and a mobile terminal, and specifically a camera apparatus and a mobile terminal having a function that adjusts a composition of an object image by a zoom processing.

2. Description of the Related Art

One example of a camera apparatus having a zoom function is disclosed in a related art described below. A camera of the related art performs a zoom processing such that all persons whose faces are detected by the camera can be imaged.

In the related art camera, if and when an erroneous detection occurs in detecting the face, a composition is decided while the face detection is in error. Furthermore, in a case that it is not necessary to image all persons that whose faces are detected, e.g. in a case that a person belonging to another group is accidentally imaged, it is necessary to make an operation that an unnecessary person is removed, and therefore, an automatic zoom processing cannot be used.

SUMMARY OF THE INVENTION

Therefore, it is a primary object of the present invention to provide a novel camera apparatus and mobile terminal.

Another object of the present invention is to provide a camera apparatus and mobile terminal capable of adjusting a composition by a zoom processing even if it is not necessary to image all persons whose faces are detected.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect according to the present invention is a camera apparatus which comprises an inputting portion and a display capable of displaying an object image imaged by a camera module, comprising: a face detecting portion which detects a face of a person image included in the object image; a face mark displaying portion which displays on the display a face mark at a portion of a face detected by the face detecting portion; a target specifying portion which specifies one or more person images out of the person images onto each of which the face mark is displayed as a zoom processing target based on an operation of a user for the inputting portion; and a composition changing portion which changes a composition by performing a zoom processing on the object image including the zoom processing target.

A second aspect according to the present invention is a mobile terminal within which a camera apparatus according to the first aspect of the present invention is incorporated.

A third aspect according to the present invention is a camera controlling method of a camera apparatus which comprises an inputting portion and a display capable of displaying an object image imaged by a camera module, comprising steps of: detecting a face of a person image included in the object image; displaying on the display a face mark at a portion of a detected face; specifying one or more person images out of the person images onto each of which the face mark is displayed as a zoom processing target based on an operation of a user for the inputting portion; and changing a composition by performing a zoom processing on the object image including the zoom processing target.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1(a) is a perspective viewed from a front surface side and FIG. 1(b) is a perspective viewed from a rear surface side.

FIG. 3(a) is a displaying example that faces of four (4) person images displayed as an object are detected and marks are applied to their faces, FIG. 3(b1), FIG. 3(b2), FIG. 3(b3) are displaying examples showing a manner that a combination of two (2) person images is changed at a time that an operation for selecting two (2) person images out of four (4) images is performed, and FIG. 3(c1), FIG. 3(c2), FIG. 3(c3) are displaying examples showing a manner that a zoom processing and so on for arranging the two (2) persons that a user finally designates in a predetermined composition.

FIG. 6(a) is a displaying example at a time that a face detection of each person image is performed, and FIG. 6(b) is a displaying example at a time that two (2) person images are selected as a zoom processing target from a state of FIG. 6(a).

FIG. 7(a) is a displaying example at a time that a face detection of each person image is performed, and FIG. 7(b) is a displaying example at a time that two (2) person images are selected as a zoom processing target from a state of FIG. 7(a).

DETAILED DESCRIPTION OF THE PREFERRED EMBODIMENTS

Figure 1:
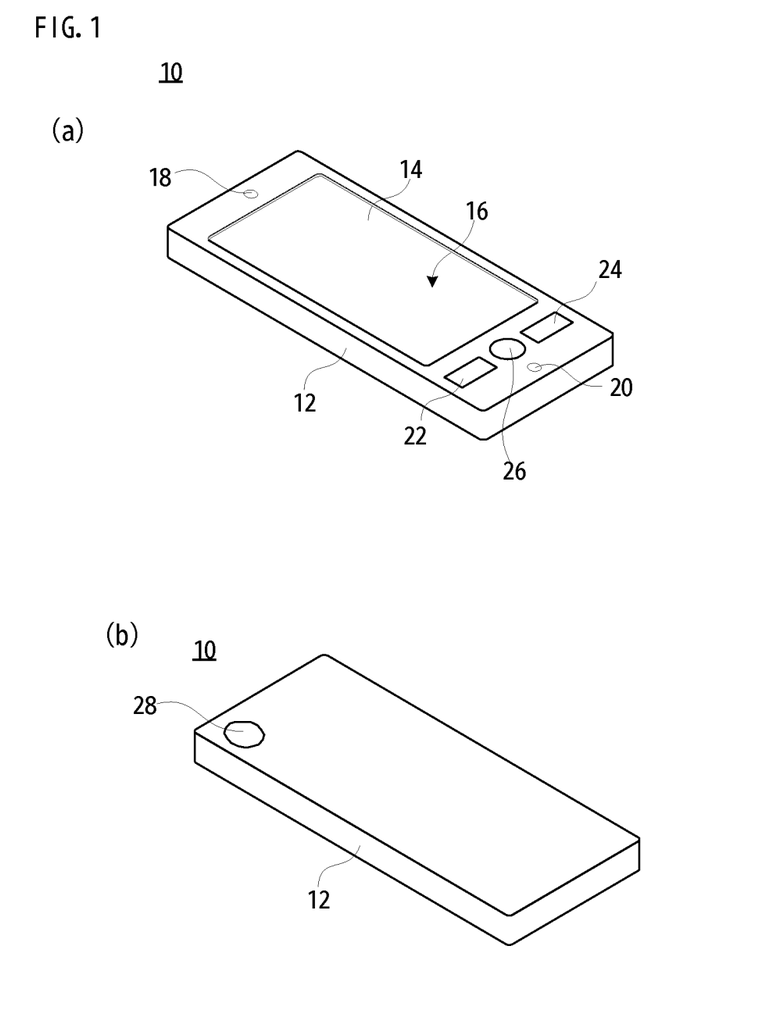
FIG. 1 is an appearance view showing a mobile terminal of one embodiment according to the present invention.

With referring to FIG. 1, a mobile terminal 10 of one embodiment according to the present invention is a smart phone as one example, and includes a longitudinal flat rectangular housing 12. However, it is pointed in advance that the present invention can be applied to an arbitrary mobile terminal such as a conventional feature phone, a tablet terminal, a PDA, etc.

A display 14 such as a liquid crystal, organic EL or the like is provided on a main surface (front surface) of the housing 12. A touch panel 16 is provided on the display 14. Therefore, in the mobile terminal 10 of this embodiment shown, the most of input operations except an operation through a hard key described later are performed through the touch panel 16.

A speaker 18 is housed in the housing 12 at a side of the front surface at one end of a longitudinal direction, and a microphone 20 is housed at a side of the front surface at the other end in the longitudinal direction.

As a hard key constituting an inputting portion together with the touch panel 16, in this embodiment, a call key 22 and an end key 24 and a menu key 26 are provided.

For example, the user can input a telephone number by making a touch operation on the touch panel 16 with respect to a dial key (not shown) displayed on the display 14, and start a telephone conversation by operating the call key 22. If and when the end key 24 is operated, the telephone conversation can be ended. In addition, by long-depressing the end key 24, it is possible to turn-on/-off a power of the mobile terminal 10.

If the menu key 26 is operated, a menu screen is displayed on the display 14, and in such a state, by making a touch operation on the touch panel 16 against a soft key, a menu icon (both, not shown) or the like being displayed on the display 14, it is possible to select a menu, and to decide such a selection.

In addition, the above-described menu key 26 functions as a shutter key or imaging key in a case that the mobile terminal 10 is set to a camera mode.

A lens aperture 28 for a camera module 48 (FIG. 2) described later is formed on the other surface (rear surface) of the housing 12. Therefore, the camera module images or takes an image through the aperture 28. That is, if it is intended to take a picture by the camera module in the mobile terminal 10 of this embodiment, the lens aperture 28 is oriented to an object, and then, the menu key 26 functioning as the imaging key is operated.

Figure 2:
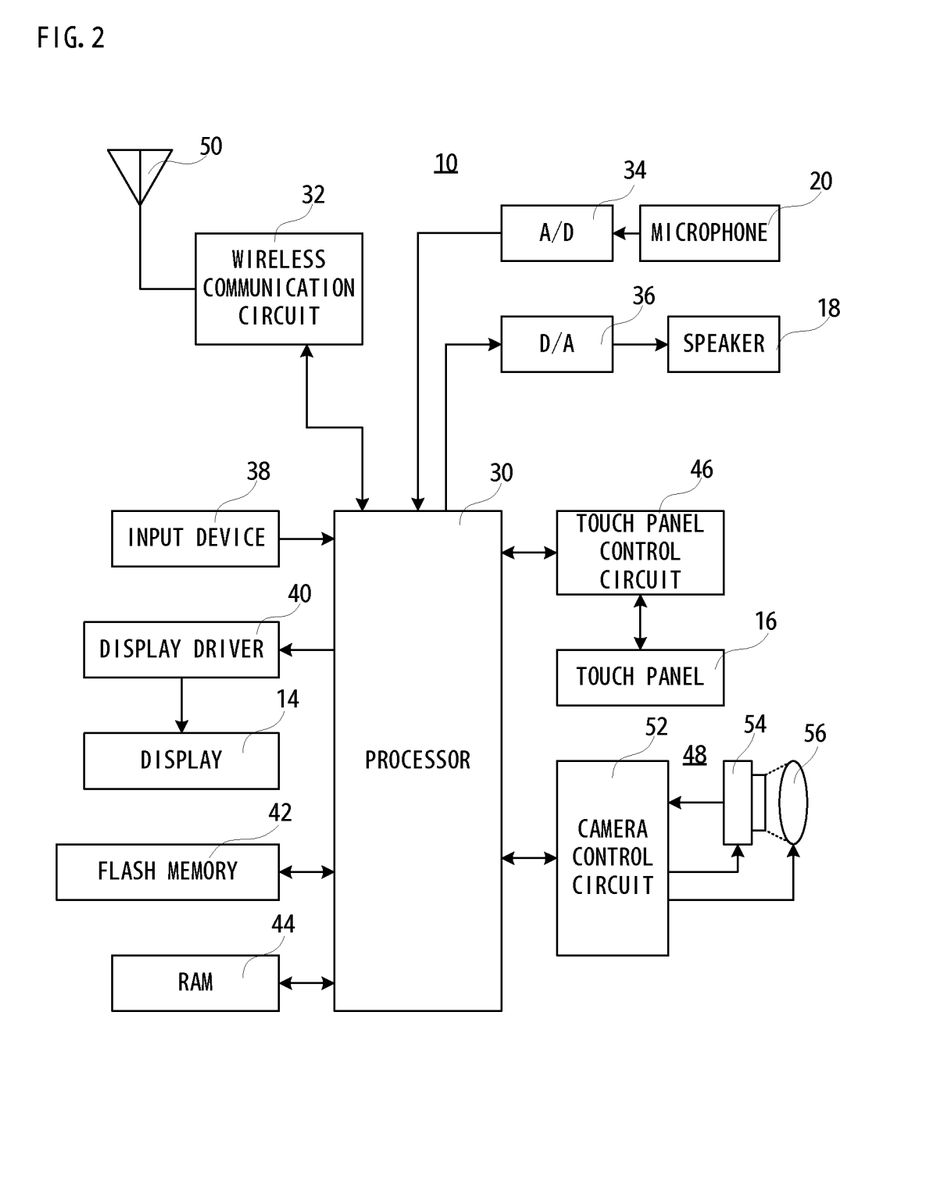
FIG. 2 is an illustrative view showing electric structure of the mobile terminal shown in FIG. 1.

With referring to FIG. 2, the mobile phone 10 of the embodiment shown in FIG. 1 includes a processor 30 called as a computer or a CPU. The processor 30 is connected with a wireless communication circuit 32, an A/D converter 34, a D/A converter 36, an input device 38, a display driver 40, a flash memory 42, a RAM 44, a touch panel control circuit 46, a camera module 48, etc.

The processor 30 is in charge of a whole control of the mobile phone 10. All or a part of a program set in advance on the flash memory 42 is, in use, developed into the RAM 44, and the processor 30 operates in accordance with the program in the RAM 44. In addition, the RAM 44 is further used as a working area (including a drawing area) or a buffer area for the processor 30.

The input device 38 includes the touch panel 16 shown in FIG. 1, the hard keys 22. 24 and 26, and constitutes an operating portion or an inputting portion. Information (key data) of the hard key operated by the user is input to the processor 30.

The wireless communication circuit 32 is a circuit for transmitting and receiving a radio wave for a telephone conversation and a mail via an antenna 50. In this embodiment, the wireless communication circuit 32 is a circuit for performing a wireless communication with a CDMA system. For example, if the user designates a telephone dispatch (telephone call) using the input device 38, the wireless communication circuit 32 performs a telephone call processing under instructions from the processor 30 and outputs a telephone call signal via the antenna 50. The telephone call signal is transmitted to a telephone at the other end of the line through a base station and a communication network (not shown). Then, an incoming processing is performed in the telephone at the other end of the line, a communication-capable state is established and the processor 30 performs the telephonic communication processing.

Specifically describing, a normal telephonic communication processing, a modulated sound signal sent from a telephone at the other end of the line is received by the antenna 50. The modulated sound signal received is subjected to a demodulation processing and a decode processing by the wireless communication circuit 32. A received sound signal obtained through such processing is converted into an analog sound signal by the D/A converter 36 to be output from the speaker 18. On the other hand, a sending sound signal taken-in through the microphone 20 is converted into sound data by the A/D converter 34 to be applied to the processor 30. The sending sound signal which is converted into the sound data is subjected to an encode processing and a modulation processing by the wireless communication circuit 32 under instructions by the processor 30 to be output via the antenna 50. Therefore, the modulated sound signal is transmitted to the telephone at the other end of the line via the base station and the communication network.

When the telephone call signal from a telephone at the other end of the line is received by the antenna 50, the wireless communication circuit 32 notifies the processor 30 of the incoming call. In response thereto, the processor 30 displays on the display 14 sender information (telephone number and so on) described in the incoming call notification by controlling the display driver 40. In addition, at the approximately same time, the processor 30 outputs from the speaker 18 a ringtone (may be also called as a ringtone melody, a ringtone voice).

Then, if the user performs a responding operation by using the call key 22 (FIG. 1), the wireless communication circuit 32 performs a processing for establishing a communication-capable state under instructions by the processor 30. Furthermore, when the communication-capable state is established, the processor 30 performs the above-described normal telephone communication processing.

If the telephone communication ending operation is performed by the end key 24 (FIG. 1) included in the input device 38 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone communication processing. Furthermore, in a case that the telephone ending signal from the telephone at the other end of the line is previously received, the processor 30 also terminates the telephone communication processing. In addition, in a case that the telephone communication ending signal is received from the mobile communication network not from the telephone at the other end of the line, the processor 30 also terminates the telephone communication processing.

The microphone 20 shown in FIG. 1 is connected to the A/D converter 34, and as described above, a sound signal from the microphone 20 is input to the processor 30 as digital sound signal through the A/D converter 34. The speaker 18 is connected to the D/A converter 36. The D/A converter 36 converts a digital sound signal into an analog sound signal so as to apply to the speaker 18 via an amplifier (not shown). Therefore, a sound or voice of the sound data is output from the speaker 18.

In addition, the processor 30 adjusts, in response to an operation of a volume (not shown) by the user, a sound volume of the sound output from the speaker 18 by controlling an amplification factor of the amplifier connected to the D/A converter 36.

The display driver 40 is connected with the display 14 shown in FIG. 1, and therefore, the display 14 displays an image or video in accordance with image or video data output from the processor 30. That is, the display driver 40 controls a displaying by the display 14 which is connected to the display driver 40 under instructions by the processor 30. In addition, the display driver 40 includes a video memory (not shown) which temporarily stores the image or video data to be displayed. The display 14 is provided with a backlight which includes a light source of an LED or the like, for example, and the display driver 40 controls, according to the instructions of the processor 30, brightness, light-on/off of the backlight. The display panel of the display 14 is lightened.

The touch panel 16 shown in FIG. 1 is connected to the touch panel control circuit 46. The touch panel control circuit 46 applies a necessary voltage, etc. to the touch panel 16, and inputs to the processor 30 a touch start signal indicating a start of a touch by the user, a touch end signal indicating an end of a touch by the user, and coordinates data indicating a touch position that the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers is brought into contact with the touch panel 16, for example. In addition, the touch panel 16 is a pointing device which is provided on the display 14 and designates an arbitrary position within a screen of the display. The touch panel control circuit 46 functions as a touch detecting portion, and detects a touch operation within a touch-effective range of the touch panel 16, and outputs coordinates data indicative of a position of the touch operation to the processor 30. That is, the user can input an operating position, an operating direction and so on to the mobile phone 10 by touching the surface of the touch panel 16.

In addition, a touch operation is not limited to an operation by a finger, may be performed by a touch pen that an electric conductor is attached at a tip end thereof or the like. Furthermore, for a detection system of the touch panel 16, a surface-type electrostatic capacitance system may be adopted, or a resistance film system, an ultrasonic system, an infrared ray system, an electromagnetic induction system or the like may be adopted.

The camera module 48 includes a camera control circuit 52 connected to the processor 30, and in the camera control circuit 52, a motor which adjusts a position of an image sensor 54 and/or a focus lens 56 (focus) in response to instructions from the processor 30 is included. The camera control circuit 52 also converts an optical image taken-in from the image sensor 54 into image or video data so as to input to the processor 30.

That is, the camera module 48 is utilized for imaging a still image or a moving image. For example, if a key operation or a touch operation for performing in the input device 38, the processor 30 sets a camera mode and activates the camera control circuit 52.

In an imaging area of the image sensor 54, photo-receiving elements corresponding to UXGA (1600×1200 pixels) are formed. Therefore, if an optical image of an object is irradiated onto the image sensor 54, due to the photoelectric conversion in the imaging area, charges corresponding to the optical image of the object, that is, a raw image signal of UXGA is produced.

If the camera function is performed, in order to display a real time moving image of the object, i.e. a through image (a preview image) on the display 14, the processor 30 activates an image sensor driver incorporated within the camera control circuit 52, and instructs the image sensor driver to make an exposure operation and a read operation of the charges corresponding to a designated read area.

The image sensor driver performs an exposure on an imaging surface of the image sensor 54, and a read-out of the charges produced by the exposure. As a result, a raw image signal is output from the image sensor 54. The output raw image signal is input to the camera control circuit 52 which conducts to the input raw image signal the processing of color separation, white balance adjustment, YUV conversion and so on, thereby to produce image data of YUV format, which is then input to the processor 30.

The image data of YUV format input to the processor 30 is saved (temporarily stored) in the RAM 44 by the processor 30. At this time, the processor 30 outputs a thinning read instruction to the display driver 40, which outputs the image data of YUV format to the display 14 according to the thinning read instruction issued from the processor 30. Accordingly, a low resolution (320×240 pixels, for example) through image representing an objective scene is displayed on the display 14.

Here, the camera control circuit 52 calculates a focus evaluation value from the raw image signal, and outputs the focus evaluation value to the processor 30. The processor 30 performs an AF processing based on the focus evaluation value output from the camera control circuit 52. During the AF processing, the camera control circuit 52 adjusts a lens position of the focus lens 44 under instructions by the processor 30. As a result, a through image bringing the object into focus is displayed on the display 14.

Next, if an imaging operation of a still image is performed, that is, if an operation of the menu key 26 is performed, the processor 30 outputs an executable instruction of a main imaging process for a still image to the camera control circuit 52. When the executable instruction is issued, the camera control circuit 52 performs the above-described respective processing on the UXGA raw image signal output from the image sensor 54 so as to output the image data of YUV format to the processor 30. The processor 30 converts (compresses) the image data of YUV format to the image data of JPEG format to store once in the RAM 44. Then, the processor 30 reads the image data from the RAM 44 and stores the data as an image file into a flash memory 42 while meta information is associated therewith. At this time, the processor 30 makes a sound notifying that the main imaging process is performed to be output from the speaker 18. In addition, in the flash memory 42, at least one folder is set, and an image file is saved in a folder.

In addition, the meta information of the camera function includes time information, an image size, a model name (type number) of the mobile phone 10, etc. The meta information related to the image data is saved in Exif format.

In addition, in other embodiments, the wireless communication circuit 32, the A/D converter 34 and the D/A converter 36 may be incorporated within the processor 30.

Figure 3:
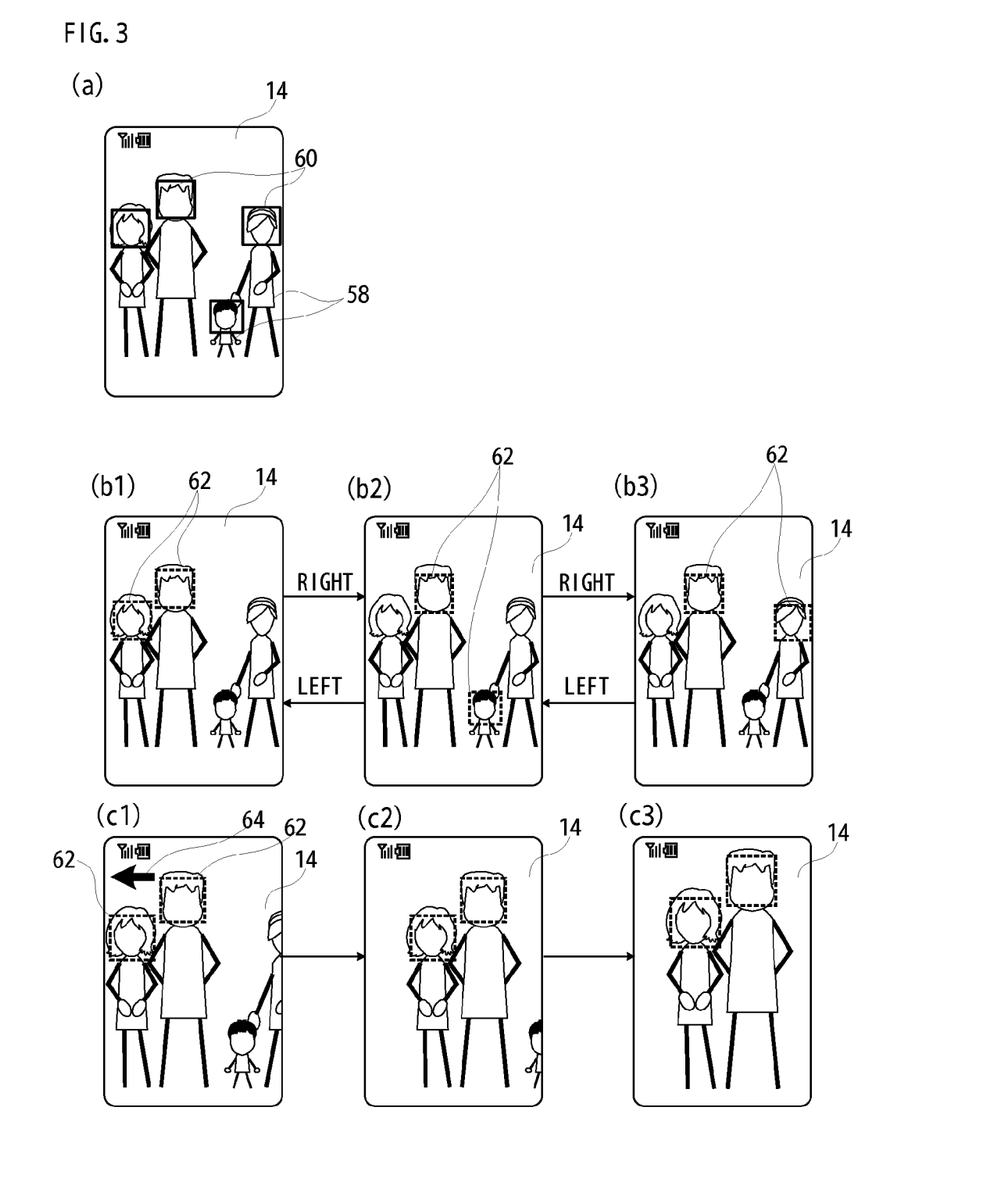
FIG. 3 is an illustrative view for simply explaining a procedure performing a zoom processing in FIG. 1 embodiment.

Here, with referring to FIG. 3, an outline of an operation of this embodiment is described. A feature of the embodiment is that when an object especially a person is to be imaged in the camera mode, by automatically performing a zoom-up or zoom-down (often, called as "zoom processing"), a picture having a composition according to the number of persons being imaged can be obtained.

FIG. 3(*a*) is a displaying example on the display 14 (FIG. 1) at a time that the user images four (4) persons and in this displaying example, there are four (4) persons as an object, and each is displayed as a person image 58. Then, in this embodiment, by performing a face detecting function by a face detecting program (described later), a face mark 60 which shows a face and has a predetermined shape such as a rectangular with a predetermined color such as a red color is displayed at a portion of the face of each person image 58. Therefore, the user can confirm that the camera module 48, that is, the processor 30 currently detects four (4) persons as the object by seeing the face mark 60.

Therefore, in a case that the detection of the processor 30 is different from an intention of the user, for example, at a time that although the user intends to image only three (3) persons, a person at a distance is carelessly imaged, four (4) face marks 60 exist, or at a time that the number of the face marks is larger or smaller in comparison with the number of the person images, the user can easily notice such an erroneous detection.

In a state of FIG. 3(*a*), the user designates or selects in accordance with a target designating program (described later) which one or more person images out of four (4) person images 58 shown by four (4) face marks 60 are to be imaged.

For example, if the mobile terminal is provided with a ten key, by inputting a numeral value equal to or less than the number of the face marks 60 by the ten key, it is set how many person images are to be incorporated in a picture.

For example, if the mobile terminal 10 is not provided with a ten key, a numeral key for setting the number of persons is displayed on the display 14 as a soft key, by using the same, the user inputs a numeral value equal to or less than the number of the face marks 60.

For example, in a mobile terminal having no ten key and no function for displaying a numeral key, the number of the person images to be incorporated in a picture may be designated by the number of times that the touch panel 16 is touched (tapped).

It is possible to determine from a numeral input of the above-described ten-key, etc. that the user designates or selects how many pieces out of the number of the displayed person images, that is, the number of the face marks; however, it is impossible to determine, by only the numeral value input, that the user intends to incorporate a person image with which face mark in a picture. Therefore, in this embodiment, according to the target designating program, by sequentially changing a selection mark 62 selected by the processor 30 as shown in FIG. 3(*b*1)-FIG. 3(*b*3) to wait a decision input by the user. Here, a case that the user designates "2" will be described.

Specifically as similar to the above-described numeral key, left and right direction keys are displayed on the display 14 as a soft key, and if the right direction key is operated by the user in a state of FIG. 3(*b*1), for example, as shown in FIG. 3(*b*2), a target person image (selection mark 62) is changed, and thus, the person images to which the selection mark 62 is to be applied are changed from the left two (2) persons in FIG. 3(*b*1) to central two (2) persons in FIG. 3(*b*2). If the right direction key is operated by the user in a state of FIG. 3(*b*2), as shown in FIG. 3(*b*3), a target person image (selection mark 62) is changed, and thus, the person images to which the selection mark 62 is to be applied are changed from the central two (2) persons in FIG. 3(*b*2) to two (2) persons in FIG. 3(*b*3). If the right direction key is further operated, the selection mark 62 is shifted to a further person image from a state of FIG. 3(*b*3), but in FIG. 3, such a state is omitted.

If the left direction key is operated, the selection mark 62 is sequentially changed from FIG. 3(*b*3) to FIG. 3(*b*2), and then, from FIG. 3(*b*2) to FIG. 3(*b*1).

After the zoom processing target is specified or designated as shown in FIG. 3(*b*1)-FIG. 3(*b*3) in accordance with the target designating program, by performing a zoom processing program (described later) in response to a user's operation starting a zoom processing, as shown in FIG. 3(*c*1)-FIG. 3(*c*3), a composition is decided by centering the person image being selected or specified becomes at the center, and wait for an operation of the imaging key 26 by the user.

Although the user designates the left two (2) person images, in a case that a person image being not designated exists adjacently as shown in FIG. 3(*c*1), it is impossible to position the two (2) person images being designated at the center even if the centering is performed. In this case, if a direction of the lens of the camera is moved in the left direction, it is possible to solve a problem that the centering cannot be performed. Therefore, in a case that it is needed to move a direction of a camera (a lens) as similar to this time, by displaying an arrow (direction) mark 64 shown in FIG. 3(*c*1) on the display 14, the user is suggested to move the direction of the camera (lens). If and when the user moves the direction of the camera (lens) in the direction of the arrow mark 64 in the state of FIG. 3(*c*1), as shown in FIG. 3(*c*2), for example, a person image being of a short statue (of a child) at a right side the specified two (2) person images is moved toward the right. Therefore, if the zooming-up and the centering are performed again in that state, a predetermined composition of an object image including two (2) person images as shown in FIG. 3(*c*3) is obtained.

Although, in the above, the outline of the feature of the embodiment was described, in the following, the same will be described in detail by using a flowchart shown in FIG. 5.

Figure 4:
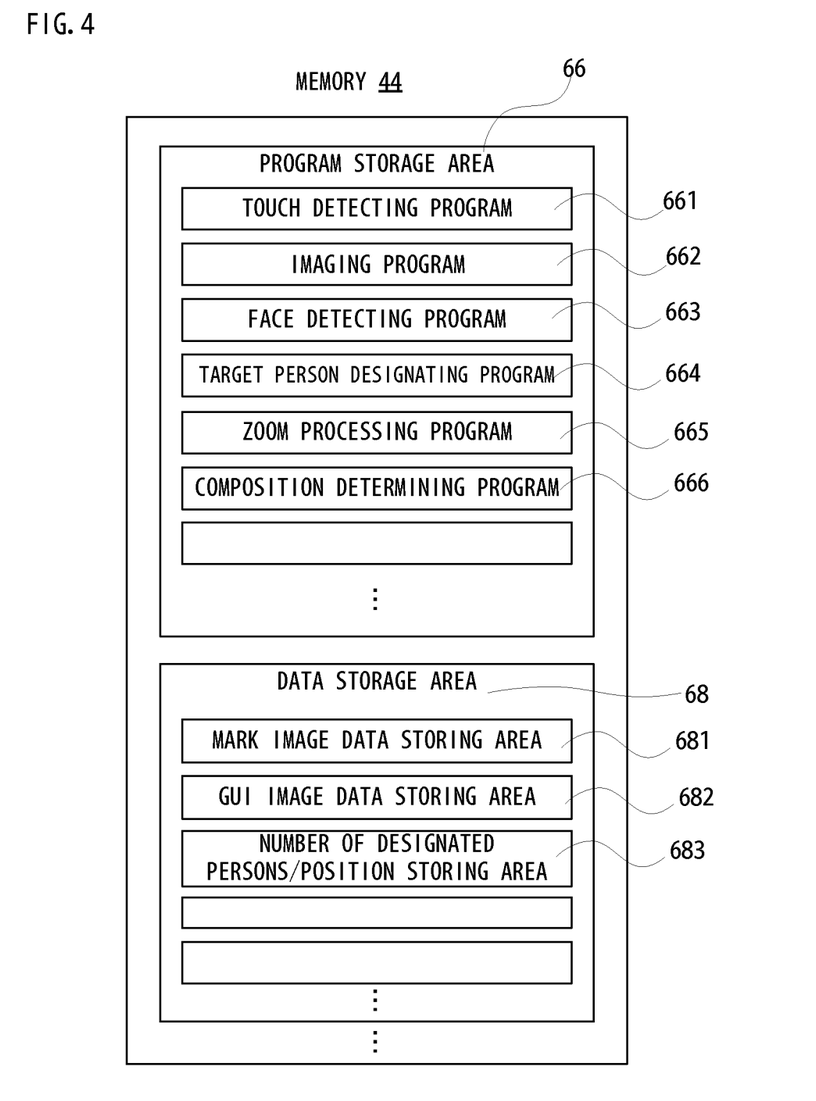
FIG. 4 is an illustrative view showing one example of a memory map of a RAM in FIG. 1 embodiment.
Figure 5:
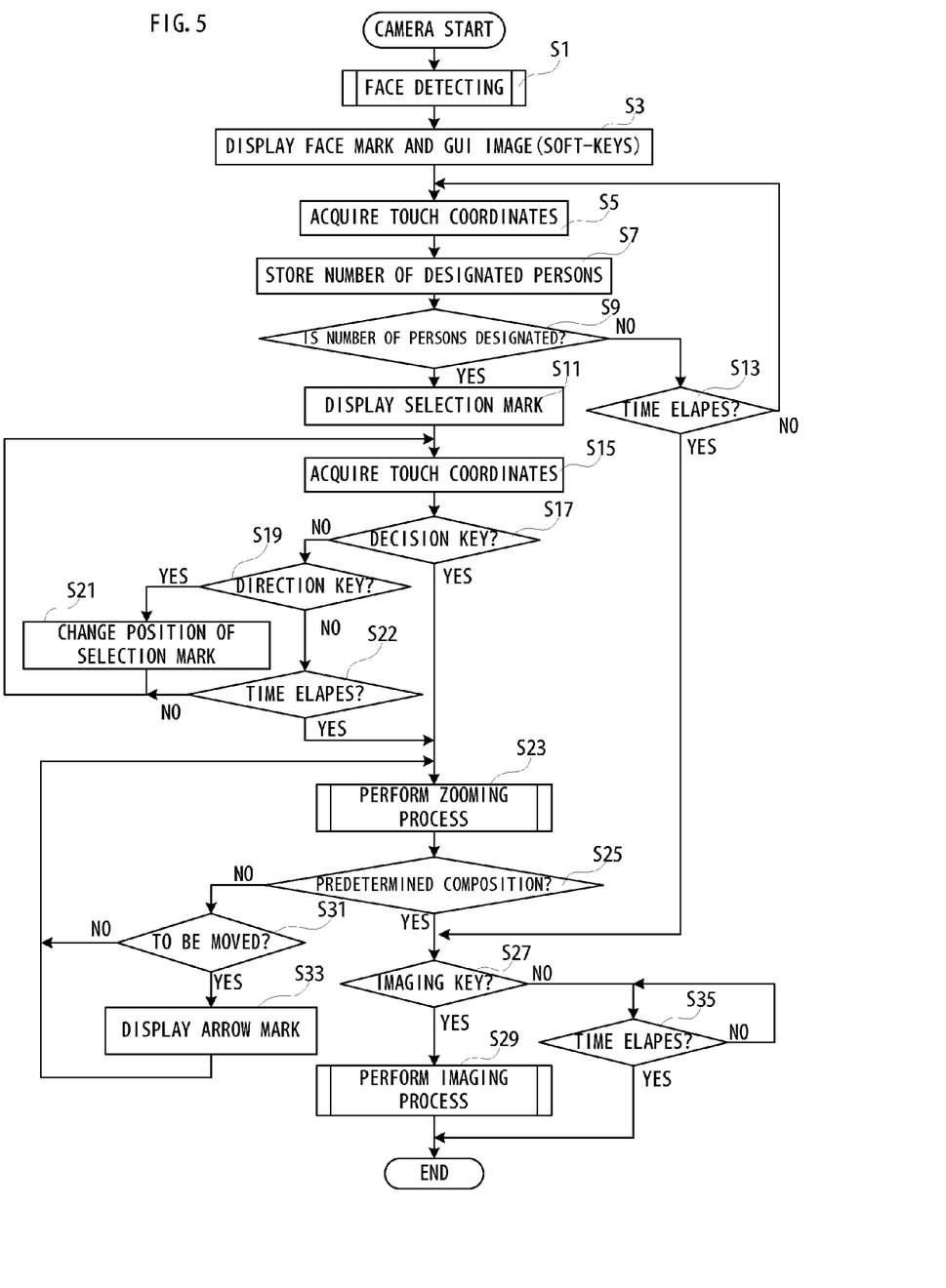
FIG. 5 is a flowchart showing one example of a zoom processing operation by a processor in FIG. 1 embodiment.

Prior to a description of FIG. 5, with referring to FIG. 4, the RAM 44 shown in FIG. 2 is formed with a program storage area 66 and a data storage area 68. The program storage area 66 is an area for storing (developing) a part or a whole of the program data set in advance in the flash memory 42 (FIG. 2) by reading the same from the flash memory 42, as aforementioned.

The program storage area 66 includes a touch detecting program 661 that is executed by the processor 30 and the touch panel control circuit 46 and for detecting a touch to the touch panel 16. The program storage area 66 further includes an imaging program 662 for imaging a picture with using the camera module 48, and according to the imaging program 662, the above-described saving processing of the image data of the imaged image to the flash memory 42 or the like is performed.

A face detecting program 663 in the program storage area 66 is a program for detecting a face portion of the person image 58 as shown in FIG. 3(*a*). A face detecting algorithm can be roughly classified into two (2) kinds, one of which is a method that a feature of appearance is directly compared geometrically, and the other of which is a method that an image is converted into a numeral statistically and the numeral is compared with a template.

In the face detecting program according to the former, by deriving a noticeable feature of the face image, it is distinguished as a face. Relative positions and sizes of parts of the face and forms or shapes of eyes, nose, cheekbones, jaw, etc. are utilized as a feature. By using such features, an image that consistent features exist is searched as a face image. In the face detecting program according to the latter, standardized data is produced from a number of face images, and individual face image is compressed to a difference between the standard data and only the data necessary for face-detecting is remained. A target image is compared with such the face data. The face detecting program of this embodiment may be based on either of the methods, and a further method.

The target designating program 664 is a program for deciding a specific face image (person image) out of the face images detected by the face detecting program 663 as a zoom processing target in response to an operation of an inputting portion or operating portion by the user, as described with referring to FIG. 3(*b*1)-FIG. 3(*b*3). That is, this is a program that when the user inputs a numeral value equal to or less than the number of the face marks 60 shown in FIG. 3(*a*) from the operating portion or inputting portion, a displaying is changed as shown in FIG. 3(*b*1)-FIG. 3(*b*3) in accordance with the operation of the operating portion or inputting portion by the user, whereby a zoom processing target can be specified or designated.

A zoom processing program 665 is a program that is executed after the zoom processing target is decided, and for deciding a predetermined composition by performing zoom-up and/or zoom-down while the zoom processing target is centered. In addition, the mobile terminal 10 of this embodiment does not have an optical zooming mechanism in the camera module 48, and therefore, a zoom processing at this time is a zoom processing called as a digital zoom that the pixel signal is processed in an electrical manner. However, in a case having an optical zooming mechanism, a zoom processing may be only by the optical zooming mechanism or may be a zoom processing using an optical zoom and a digital zoom.

A composition determining program 666 is a program for determining whether or not a composition of an object image including the zoom processing target becomes a predetermined composition or approximated thereto to some extent. In addition, the composition determining program 666 is executed in the process of the zoom processing, and thus, may be incorporated as a part of the zoom processing program 665.

The composition determining program 666 determines whether or not the object image at that time becomes a predetermined composition in accordance with determination criteria of (1) whether or not the person image of one or more zoom processing target is centered in a horizontal (left and right) direction and/or (2) the person image of one or more zoom processing target is centered in a vertical (up and down) direction. It is possible to determine whether or not the centering is performed by testing magnitudes (width) of left, right, upper and lower margins (background image) of the concerned person image.

However, the determination criteria of the above-described (1) and/or (2) are simple examples, and a uniform margin may not be formed at left and right and up and down. For example, according to a previous setting by the user, it may be determined that the object image becomes a predetermined condition at a time that the person image of the zoom processing target is rendered to the right, left, up or down within the whole object image.

The data storage area 68 of the RAM 44 includes a mark image data storing area 681, a GUI image data storing area 682, a designated number of persons/positions storing area 683, etc. The mark image data storing area 681 stores displaying image data for displaying the face mark 60 and the selection mark 62 used in the embodiment on the display 14 as shown in FIG. 3. The GUI image data storing area 682 stores GUI image data for displaying on the display 14 a numeral key 70, a direction key 72 and a decision key 74 that will be described later with referring to FIG. 6. The mark image data storing area 681 or the GUI image data storing area 682 is also stored with image data for displaying the arrow mark 64 shown in FIG. 3(*c*1). In addition, these displaying image data are read from the flash memory 42 (FIG. 2) to be stored in the areas 681 and 682.

Figure 6:
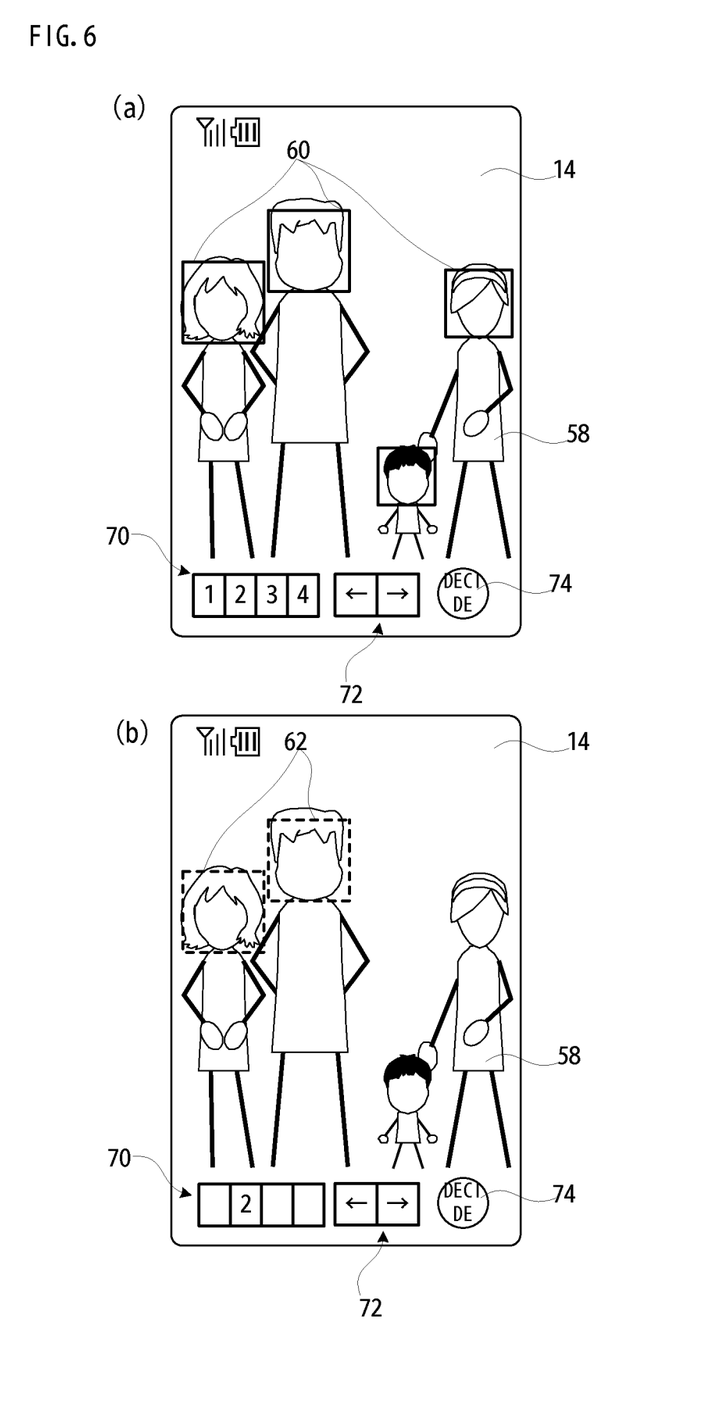
FIG. 6 is an illustrative view for explaining an operation for deciding a zoom processing target in FIG. 5 embodiment.

The designated number of persons/positions storing area 683 is a kind of working area, and is stored with the number of persons (this is a number equal to or less than the number of the person images a face each of which is detected) of the zoom processing target that the user designates by using the GUI (FIG. 6). The designated number of persons/positions storing area 683 also stores that the person image at what position is specified as the zoom processing target, that is, the position of the zoom processing target, (for example, in a case that four (4) person images exist, left two (2) persons or center two (2) persons or the like).

The processing shown in FIG. 5 is executed by the processor 30 mainly, and started at a time that the camera mode is rendered, that is, the camera module 48 is activated.

In a step S1, the processor 30 acquires image data of an object image at that time from the camera control circuit 52 of the camera module 48 so as to store in the data storage area 68 of the RAM 44, and detects a face portion in the object image data by executing the face detecting program 663 of FIG. 4 with respect to the object image data.

In a next step S3, the processor 30 reads respective image data from the mark image data storing area 681 and the GUI image data storing area 682 of FIG. 4, and displays the face marks 60, 60, —at positions of face images detected in the step S1 as shown in FIG. 6(*a*), and displays at a lower portion of the display 14 the GUI image (soft key), that is, in this embodiment, the numeral key 70, the direction key 72 and the decision key 74, respectively. In addition, a displaying example of FIG. 6(*a*), the numeral key 70 is displayed so as to input a numeral (1, 2, 3 or 4) up to the same number as the number (four (4)) of the face marks 60. It is needless to say that these soft keys 70, 72 and 74 also constitute an inputting portion or an operating portion together with the touch panel 16 and hard keys 22-26.

Since the face mark is applied to the person image where the face is detected in the step S3, the user can confirm by seeing the face mark that the face of what person image is detected in the current object image.

In a succeeding step S5, the processor 30 acquires coordinates data of a touch position from the touch panel control circuit 46.

The processor 30 can know how many person images are selected by the user by detecting that the touch operation is made on what position in the numeral key 70. Therefore, in a step S7, the processor 30 stores data of the number of persons that the user designates in the designated number of persons/positions storing area 683 of the RAM 44 shown in FIG. 4.

When the number of persons of the zoom processing target is thus designated by the user through an operation of the numeral key 70 of the GUI, "YES" is determined in a step S9. When "YES" is determined in the step S9, the processor 30 executes a next step S11.

In the step S11, the processor 30 reads the selection mark image data from the mark image data storing area 681 of FIG. 4 so as to display the selection mark 62 at the position of the face image detected in the step S1 as shown in FIG. 6(*b*) by executing the target designating program 664 in FIG. 4. In addition, at this time, if the person image(s) the number of which is less than the person images being displayed is(are) designated in the steps S5 and S7, it is not clear to which person image the selection mark 62 is to be applied. Then, in this embodiment shown, it is set or programmed in advance that the selection mark is displayed on the person images of the designated number of persons in the left of the display 14 as default. For example, in FIG. 6(*b*), the numeral key of "2" is operated, that is, two (2) person images are selected, at first, the selection marks 62 and 62 are displayed on the person image at the left and the person image on the right of the left end person image. When the selection mark 62 is displayed in this step S11, the processor 30 temporarily stores in the above-described designated number of persons/positions storing area 683 in FIG. 4 the position data indicating which person image is selected as the zoom processing target.

However, as a method for to which person image the selection mark 62 is to be applied at first, (1) a method that the selection mark 62 is displayed preferentially on the person images such that a combination including a person whose face is registered in the mobile terminal 10 can be obtained, (2) a method that the selection mark 62 is displayed preferentially on the person images such that a combination including a person existing at the center of a screen can be obtained, or the like may be adopted. That is, it may be arbitrarily decided the selection mark is to be firstly displayed onto which person image.

Since it is possible to thus select only the person image being a part of the object image as the zoom processing target, even if only a part of the person images are selected, the composition of the object image can be properly adjusted by the zoom processing described later. In addition, since the selection mark is displayed on the person image, the user can easily confirm which person image he/she selects as the zoom processing target, and therefore, it is possible to prevent erroneous person images from being decided as the zoom processing target.

When "NO" is determined in the step S9, that is, in a case that the user did not perform an operation for designating the number of persons, the processor 30 determines a predetermined time period elapses in a step S13, and if it is determined that the predetermined time period elapses in the step S13, the process proceeds to a step S27 with no action.

After the selection mark 62 is displayed in the step S11, in a step S15, the processor 30 acquires the touch coordinates data from the touch panel control circuit 46.

Then, in a step S17, it is determined whether or not the touch coordinates acquired in the step S15 shows an operation of the decision key 74 of the GUI, that is, whether or not the decision key 74 is operated. If "YES" is determined, the processor 30 performs the zoom processing described later in a step S23.

If "NO" is determined in the step S17, the processor 30 determines in a step S19 whether or not the touch coordinates acquired in the step S15 shows an operation of the direction key 72, that is, whether or not the direction key 72 is operated.

An operation of the direction key 72 means that the user wishes to change the person image onto which the selection mark 62 is applied, that is, that the person image that the user wishes to select as the zoom processing target is different from the person image onto which the selection mark 62 is currently displayed in the step S11, and thus, the processor 30 performs the target designating program 664 in a succeeding step S21 to change the person image onto which the selection mark 62 is to be applied as described with referring to FIG. 3(*b*1)-FIG. 3(*b*3), for example, and then, the process returns to the previous step S15. Then, when the position of the selection mark 62 is changed in the step S21, as similar to the processing in the step S11, the processor 30 temporarily stores the position data representative of a position of the person image being newly selected as the zoom processing target in the designated number of persons/positions storing area 683 in FIG. 4.

Thereafter, until the operation of the decision key 74 is detected in the step S17, the steps S19, S21 and S15 are repeatedly executed. Therefore, the steps S19 and S21 constitute a target changing portion which changes the zoom processing target based on the operation by the user to an inputting portion that is the direction key 72 in this embodiment.

As described above, in a case that the erroneous person image has been selected as the zoom processing target or in a case that the selection of the zoom processing target is to be changed based on a result of the user's reconsideration and so on, it is possible to easily change such a selection.

However, if "NO" is determined in the step S19, the processor 30 determines whether or not the predetermined time period elapses in the step S22. If the user did not operate the direction key 72 until the predetermined time period elapses, that is, if the processor 30 determines "YES" in the step S22, it means that the user admits the person image selected at that time as the zoom processing target. Therefore, in this case, the processor 30, as similar to a time that the operation of the decision key 74 is detected in the previous step S17, executes the step S23 as it is.

When the operation of the decision key 74 is detected in the step S17, or when "YES" is determined in the step S22, in the steps S23 and S25, the processor 30 executes the zoom processing program 665 and the composition determining program 666 shown in FIG. 4 to perform zoom-up and/or zoom-down processing until the composition of the object image including one or more person images (zoom processing target) that the user finally decided becomes the above-described predetermined composition. In addition, in performing the zoom processing in the step S23, the processor 30 is able to grasp which person image the user finally decided as the zoom processing target by the data of the number of persons and the positions temporarily stored in the designated number of persons/positions storing area 683 of the RAM 44. Therefore, the processor 30 performs the zoom processing such that the person image shown by the data of the number of persons and the positions in the designated number of persons/positions storing area 683 can be included in the object image successfully.

As described above, the step S23 performs a changing operation of the composition of the object image by performing the zoom processing to the object image including one or more person images (zoom processing target) until the object image reaches the predetermined composition or approaches the predetermined composition to some extent, and therefore, it is possible to say in a sense that the processor 30 executing the step S23 constitutes a composition changing portion.

Then, when the processor 30 determines "YES" in the step S25, that is, when the object image reaches the predetermined composition or approaches the predetermined composition, an operation of the menu key 26 (this functions as an imaging key in the camera mode) shown in FIG. 1 is permitted. That is, in a case that a composition determining function by the zoom processing in taking a picture, if it is not detected that the object image becomes a predetermined composition or the object image approaches the predetermined composition in the step S25, an operation of the imaging key 26 is invalid. That is, in a case that the composition determining function through the zoom processing is selected, only at a time that "YES" is determined in the step S25, an operation of the menu key 26 shown in FIG. 1 is permitted.

As described above, since the imaging key cannot be operated unless the object image including the zoom processing target becomes a predetermined composition, the imaging or taking a picture with an incomplete composition can be effectively prevented.

Then, as described above, when "YES" is determined in the step S25, or when the user did not designate the number of persons in the steps S5 and S7, or when the predetermined time period elapses in the step S13, the processor 30 determines whether or not the menu key 26 is operated based on the key information from the input device 38 (FIG. 2).

If "YES" is determined in a step S27, in a succeeding step S29, the processor 30 performs an imaging process based on the imaging program 662 shown in FIG. 4. Therefore, in a case that the composition determining function by the zoom processing is selected, the image data of the object image including one or more zoom processing target designated by the user, which becomes the predetermined composition by the zoom processing is saved into a recording medium such as the flash memory 42. However, such an imaging process itself is as described above, and therefore, a further description is omitted here. Thereafter, the operation is terminated.

Furthermore, when the object image does not become the predetermined composition even if the zoom processing (step S23) is performed, that is, when "YES" is not determined in the step S25, in a step S31, the processor 30 determines whether or not the predetermined composition can be obtained if the user moves the direction of the mobile terminal 10, that is, the direction of the lens of the camera. For example, in a case that as a criterion for determining whether or not the predetermined composition is obtained, a criterion that the person image of the zoom processing target is suitably centered within the object image is employed, in FIG. 6(b), for example, if the person image at the right of the zoom processing target to which the selection mark 62 is applied is removed, the two (2) zoom processing targets can be suitably centered. The processor 30 makes such a determination on the basis of the zoom processing program 665 and determines in the step S31 whether or not the direction of the mobile terminal 10, that is, the direction of the lens of the camera is needed to be moved.

If "YES" is determined in the step S31, in a succeeding step S33, the processor 30 displays an arrow mark 64 shown in FIG. 3(c1), for example, on the display 14 as a moving guide. After the user moves the direction of the mobile terminal 10, that is, the direction of the lens of the camera in accordance with the arrow mark 64, until "YES" is obtained in the step S25, the zoom processing in the step S23 is executed again.

For example, since the direction that the lens 56 is to be moved is guided by the arrow mark 64, the composition of the object image including the zoom processing target can be easily rendered to the predetermined composition.

In addition, if it cannot be detected in the step S27 that the user operates the imaging key 26, the processor 30 terminates the operation after the predetermined time period elapses in a step S35.

In a displaying example in FIG. 6, the user specifies or selects the left two (2) persons out of the four (4) person images as the zoom processing target. In this case, a non-target does not exist between one zoom processing target and the other zoom processing target. However, according to the selection by the user, there is a case that a non-target exists between the zoom processing targets. FIG. 7(b) shows a displaying example in such a case.

In the displaying example of FIG. 7(b), the user inputs "2" as the designating number of persons so as to designate two (2) person images out of the four (4) person images and the concerned two (2) person images are at the left and right ends, and therefore, the user selects the person images at the left and right ends out of the four (4) person images as the zoom processing target. In this case, the center two (2) persons are not the zoom processing target essentially, but the two (2) person images cannot be deleted, and thus, in such a case, the selection mark 62 is also displayed on the center person image of the non-target to notify that the person image that the user does not select is also selected as the zoom processing target.

In a case as of FIG. 7(b), the selection mark 62 is displayed onto all person images in the step S11 shown in FIG. 5, and thus the zoom processing is performed as the object image including all person images in the step S23.

The displaying example of FIG. 7(b) shows a case that two (2) non-targets exist between the zoom processing targets, but even if the non-target existing between the zoom processing targets is one (1) or three (3) or more, these intervening non-target is all handled as the zoom processing target. Therefore, the zoom processing in the step S23 is performed while the non-target sandwiched by the zoom processing target is included.

Furthermore, in the above-described embodiment, when the predetermined composition is obtained in the step S25, the imaging key 26 is just operated; however, after the step S25, a fine tuning or adjustment by the user may be permitted. For example, the "predetermined composition" determined in the step S25 is uniformly decided by the composition determining program 666, and therefore, in order to avoid a picture having the same composition, after the step S25, prior to the step S27, a fine tuning or adjustment by the user, a user operation that a zooming rate is changed or the like, for example, may be accepted. In order to do so, it is considered that by displaying a GUI, for example, the user can enter the zooming rate through the GUI.

A plurality of programs utilized in the above-described embodiments may be stored in a HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a mobile phone having the structure equal to the structure of the embodiment, it is possible to obtain advantages equal to advantages according to the embodiment.

Although the numeral key 70, the direction key 72 and the decision key 74 are simultaneously displayed in the displaying example shown in FIG. 6(a), these keys may be sequentially displayed in accordance with the user's operation. For example, only the numeral key 70 is first displayed, and then, the direction key 72 and the decision key 74 are displayed after the user inputs the numeral value (selects).

Figure 7:
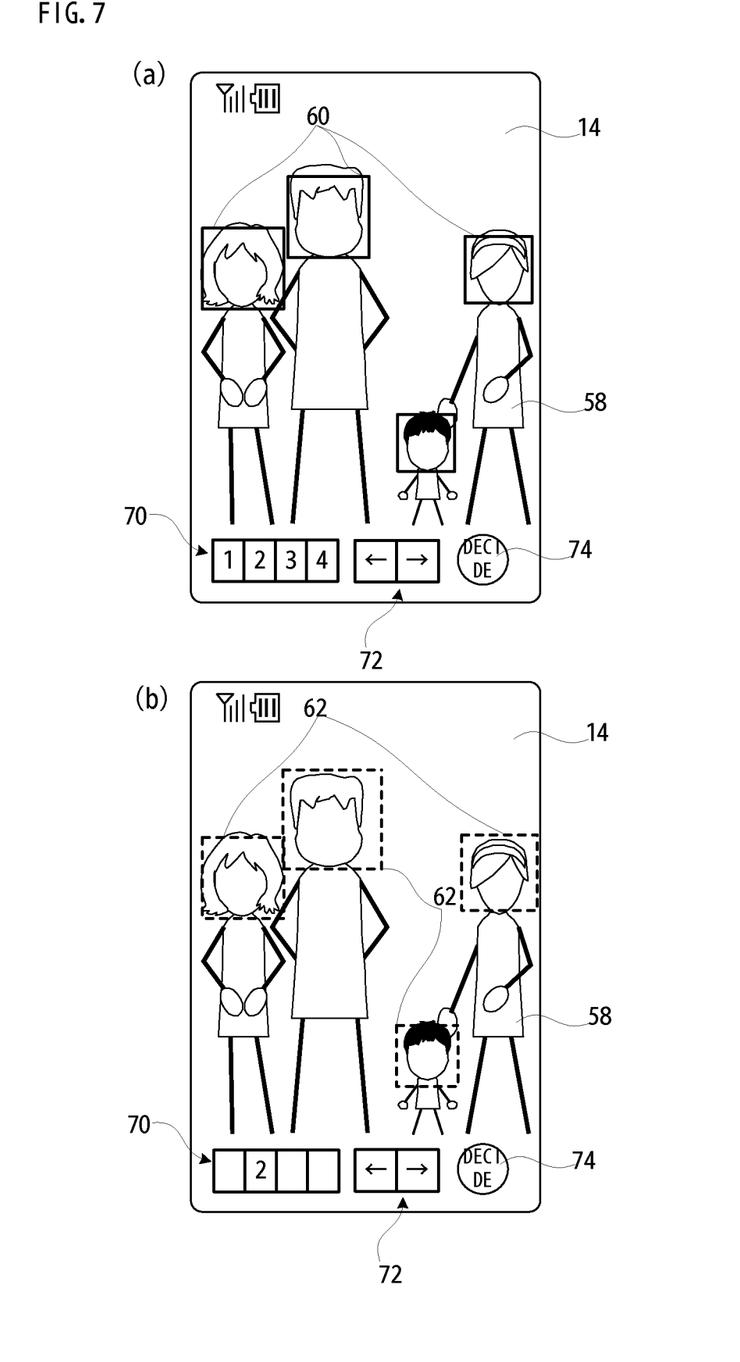
FIG. 7 is an illustrative view for explaining an operation for deciding a zoom processing target in FIG. 5 embodiment.

A label of the decision key 74 is displayed as "DECIDE" in FIG. 6 and FIG. 7, but the label may be changed to "OK".

Furthermore, the above-described embodiments was described in connection to a mobile phone, but of course, all the embodiments can be applied to not only a mobile terminal but also an electronic (digital) camera apparatus.

The specific numerical values mentioned in this specification are only examples, and changeable properly in accordance with the change of product specifications.

An embodiment is a camera apparatus which comprises an inputting portion and a display capable of displaying an object image imaged by a camera module, comprising: a face detecting portion which detects a face of a person image included in the object image; a face mark displaying portion which displays on the display a face mark at a portion of a face detected by the face detecting portion; a target specifying portion which specifies one or more person images out of the person images onto each of which the face mark is displayed as a zoom processing target based on an operation of a user for the inputting portion; and a composition changing portion which changes a composition by performing a zoom processing on the object image including the zoom processing target.

In the embodiment, a mobile terminal (10) incorporating a camera apparatus includes an inputting portion including a touch panel (16) and a hard key (22-26), for example, and has a camera module (48) including an image sensor (54) and a lens (56), for example. When the camera module (48) is activated, an object image imaged by the camera module (48) is displayed on a display (14). A face detecting portion (30, 663, S1) is a processor (30) executing a face detecting program (663), for example, and detects a face of the person image (58) included in the object image. A face mark displaying portion (30, 681, S3) displays a face mark (60) with a predetermined color such as a red color and a predetermined form or shape such as a rectangular at a portion of the face detected by the face detecting portion.

A target specifying portion (30, 664, S5-S11, S19-S21) is a processor (30) executing a target designating program (664), for example, and specifies, based on an operation by the user to the inputting portion, one or more person images out of the person image(s) onto each of which the face mark is displayed as a zoom processing target. As an example, in the embodiment, the object image including the person image onto which the face mark is being displayed on the display (14) at this time, and the processor (30) displays on this display a GUI including a numeral key (70), and a direction key (72), a decision key (74). The user operates the numeral key (70) of the GUI to input a numeral value equal to or less than the number of the person images onto each of which the face mark is applied so as to select the person image of the number represented by the numeral value. Then, the direction key (72) is operated as necessary, and the user designates the person image to be selected. Then, the user decides the person image selected by the decision key (74) as the zoom processing target.

A composition changing portion (30, 665, S23) is a processor (30) executing a zoom processing program (665) and a composition determining program (666), and changes a composition through a zoom processing, i.e. zoom-up and/or zoom-down processing of the object image including the zoom processing target.

According to the embodiment, since the face mark is applied to the person image whose face is detected, the user can confirm a face of what person is detected within the object image at that time by seeing the face mark. Therefore, it is possible to easily determine an erroneous detection and prevent the composition with the erroneous detection from being settled. Furthermore, since only the person image being a part of the object image can be selected as the zoom processing target, even if only a part of the person images is selected, the composition of the object image can be suitably adjusted by the zoom processing.

Another embodiment is a camera apparatus further comprising a composition determining portion which determines whether or not the object image reaches the predetermined composition or approached the predetermined composition to some extent, and after it is determined that the object image reaches the predetermined composition or approached the predetermined composition to some extent by the composition determining portion, an operation of an imaging key is permitted.

In this embodiment, a composition determining portion (30, 666, S25) is a processor (30) executing a composition determining program (666), for example, and determines whether or not an object image becomes a predetermined composition (a composition that a zoom processing target is centered, for example) or approaches the predetermined composition to some extent, and after it is determined that the object image reaches the predetermined composition or approaches the predetermined composition to some extent by the composition determining portion, an operation of the imaging key (26) is permitted.

According to this embodiment, the imaging key can be operated only at a time that the object image including the zoom processing target becomes the predetermined composition, and therefore, it is possible to effectively prevent a picture from being imaged with incomplete composition.

A further embodiment is a camera apparatus wherein when the user inputs a numeral value by the inputting portion, the target specifying portion specifies the input number of the person images as the zoom processing target.

A still further embodiment is a camera apparatus further comprising a selection mark displaying portion which displays a selection mark indicating that the person image is a zoom processing target on the display.

In the still further embodiment, a selection mark displaying portion (30, 664, 681, S11, S21) is a processor (30) executing a target designating program (664), for example, and displays on the display a selection mark (62) indicating that the person image onto which the selection mark is applied is the zoom processing target.

According to the still further embodiment, since the selection mark is displayed onto the person image, the user can easily confirm that he/she selects which person image as the zoom processing target, and therefore, it is possible to prevent an erroneous person image from being decided as the zoom processing target.

Another embodiment is a camera apparatus wherein the target specifying portion includes a target changing portion which changes the zoom processing target based on an operation of the user to the inputting portion.

In the embodiment, a target specifying portion (30, 664, S5-S11, S19-S21) changes the zoom processing target by an operation of the user to the inputting portion, specifically, by operating the direction key (72) of the GUI being displayed on the display, for example.

According to this embodiment, in a case that the erroneous person image is selected as the zoom processing target, or in a case that the selection of the zoom processing target is to be changed as a result of reconsideration of the user, for example, it is possible to easily change such a selection.

A still another embodiment is a camera apparatus further comprising a direction mark displaying portion which displays, when a direction of a lens is needed to be moved, a direction mark representative of a moving direction on the display.

In this embodiment, at a time that it is necessary to move a direction of a lens, a direction mark (64) representing a direction in which the direction of the lens is to be moved on the display by the direction mark displaying portion (30, 681, S33).

According to this embodiment, since the direction toward which the lens is to be moved is guided, it is possible to easily render a composition of the object image including the zoom processing target to a predetermined composition.

A further embodiment is a mobile terminal into which a camera apparatus according to any one of the above-described embodiments is incorporated.

The other embodiment is a camera controlling method of a camera apparatus which comprises an inputting portion and a display capable of displaying an object image imaged by a camera module, comprising steps of: detecting a face of a person image included in the object image; displaying on the display a face mark at a portion of a detected face; specifying one or more person images out of the person images onto each of which the face mark is displayed as a zoom processing target based on an operation of a user for the inputting portion; and changing a composition by performing a zoom processing on the object image including the zoom processing target.

According to the other embodiment, since the face mark is applied to the person image whose face is detected, the user can confirm a face of what person is currently detected within the object image by seeing the face mark. Therefore, it is possible to easily determine an erroneous detection and prevent the composition with the erroneous detection from being decided. Furthermore, since only the person image being a part of the object image can be selected as the zoom processing target, even if only a part of the person images are selected, the composition of the object image can be suitably adjusted by the zoom processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera apparatus which comprises an inputting portion and a display capable of displaying an object image imaged by a camera module, comprising:
    a face detecting portion which detects a plurality of faces for a plurality of person images included in the object image;
    a face mark displaying portion which displays on the display a face mark for each face detected by the face detecting portion;
    a target specifying portion which
        receives a user-specified number, representing a number of the plurality of person images to be included as a zoom processing target, from a user,
        identifies, as the zoom processing target, a subset of person images out of the plurality of person images that is equal in number to the user-specified number, and,
        when the identified subset of person images comprises two or more person images that are not adjacent, adds, to the zoom processing target, any of the plurality of person images that are not within the identified subset of person images but which are between the two or more person images within the identified subset of person images that are not adjacent;
    a composition changing portion which changes a composition by performing a zoom processing on the object image including the zoom processing target; and
    a composition determining portion which determines whether or not the zoom processing target is centered based on magnitudes of left, right, upper, and lower margins,
    wherein, before it is determined that the zoom processing target is centered, an operation of an imaging key is disabled, and
    wherein, as soon as it is determined that the zoom processing target is centered, an operation of the imaging key is permitted.

2. A camera apparatus according to claim 1, further comprising a selection mark displaying portion which displays on the display a selection mark indicating each person image identified as the zoom processing target.

3. A camera apparatus according to claim 1, wherein the target specifying portion includes a target changing portion which changes the zoom processing target based on an operation of the user to the inputting portion.

4. A camera apparatus according to claim 1, further comprising a direction mark displaying portion which, when the zoom processing target cannot be centered, displays a direction mark indicating a direction towards which a lens of the camera apparatus should be moved in order to center the zoom processing target.

5. A mobile terminal into which a camera apparatus according to claim 1 is incorporated.

6. A camera controlling method of a camera apparatus which comprises an inputting portion and a display capable of displaying an object image imaged by a camera module, the method comprising:
    detecting a plurality of faces for a plurality of person images included in the object image;
    displaying on the display a face mark for each detected face;
    receiving a user-specified number, representing a number of the plurality of person images to be included as a zoom processing target, from a user;
    identifying, as the zoom processing target, a subset of person images out of the plurality of person images that is equal in number to the user-specified number;
    when the identified subset of person images comprises two or more person images that are not adjacent, adding, to the zoom processing target, any of the plurality of person images that are not within the identified subset of person images but which are between the two or more person images within the identified subset of person images that are not adjacent;
    changing a composition by performing a zoom processing on the object image including the zoom processing target;
    determining whether or not the zoom processing target is centered based on magnitudes of left, right, upper, and lower margins;
    before it is determined that the zoom processing target is centered, disabling an operation of an imaging key; and,
    as soon as it is determined that the zoom processing target is centered, permitting an operation of the imaging key.

7. A camera apparatus according to claim 1, wherein the inputting portion displays a plurality of selectable numbers on the display, wherein the plurality of selectable numbers comprise every number from one to a number of person images in the plurality of person images, and wherein the user-specified number is received when the user selects the user-specified number from among the plurality of selectable numbers.

8. A camera apparatus according to claim 1, further comprising a target changing portion which changes the subset of person images to be included in the zoom processing target, wherein the inputting portion displays at least one selectable direction key, and wherein, when the user selects the selectable direction key, the target changing portion shifts the subset of person images in a direction of the selectable direction key such that one of the plurality of person images in the direction of the selectable direction key is added to the subset of person images and one of the subset of person images on a side of the subset of person images that is opposite to the direction of the selectable direction key is excluded from the subset of person images.

9. A camera apparatus according to claim 1, further comprising a displaying portion which, when the zoom processing target cannot be centered, displays a suggestion to move a lens of the camera apparatus in order to center the zoom processing target.

10. A camera apparatus according to claim 1, wherein the target specifying portion, when the identified subset of person images comprises two or more person images that are adjacent, only displays a selection mark for each of the two or more person images within the identified subset of person images.

11. A camera apparatus according to claim 1, wherein the target specifying portion, when the identified subset of person images comprises two or more person images that are not adjacent, displays a selection mark for each of the two or more person images within the identified subset of person images and displays a selection mark for any of the plurality of person images that are not within the identified subset of person images but which are between the two or more person images within the identified subset of person images that are not adjacent.

12. A camera apparatus which comprises an inputting portion and a display capable of displaying an object image imaged by a camera module, the camera apparatus comprising:
- a face detecting portion which detects a face of a person image included in the object image;
- a target specifying portion which
    - receives a user-specified number, representing a number of a plurality of person images to be included as a zoom processing target, from a user,
    - identifies, as the zoom processing target, a subset of person images out of the plurality of person images that is equal in number to the user-specified number, and,
    - when the identified subset of person images comprises two or more person images that are not adjacent, adds, to the zoom processing target, any of the plurality of person images that are not within the identified subset of person images but which are between the two or more person images within the identified subset of person images that are not adjacent; and
- a composition changing portion which changes a composition by performing a zoom processing on the object image including the zoom processing target.

13. A camera apparatus according to claim 12, wherein the target specifying portion, when the identified subset of person images comprises two or more person images that are adjacent, only displays a selection mark for each of the two or more person images within the identified subset of person images.

14. A camera apparatus according to claim 12, wherein the target specifying portion, when the identified subset of person images comprises two or more person images that are not adjacent, displays a selection mark for each of the two or more person images within the identified subset of person images and displays a selection mark for any of the plurality of person images that are not within the identified subset of person images but which are between the two or more person images within the identified subset of person images that are not adjacent.

* * * * *